(12) United States Patent
Husain et al.

(10) Patent No.: US 10,027,805 B2
(45) Date of Patent: Jul. 17, 2018

(54) CONNECTION MANAGEMENT FOR A VEHICLE TELEMATICS UNIT

(75) Inventors: Aqueel Husain, Tecumseh (CA); David A. Adams, Troy, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 2047 days.

(21) Appl. No.: 11/944,882

(22) Filed: Nov. 26, 2007

(65) Prior Publication Data

US 2009/0135845 A1   May 28, 2009

(51) Int. Cl.
*H04M 3/51* (2006.01)

(52) U.S. Cl.
CPC .... *H04M 3/5183* (2013.01); *H04M 2203/551* (2013.01)

(58) Field of Classification Search
CPC ............. H04M 2203/551; H04M 3/5183
USPC .................. 370/352; 701/220, 200
See application file for complete search history.

(56) References Cited

U.S. PATENT DOCUMENTS

| | | | | |
|---|---|---|---|---|
| 4,352,412 A * | 10/1982 | Bittar et al. | | 187/384 |
| 6,215,782 B1 * | 4/2001 | Buskens | | H04W 76/02 370/350 |
| 6,404,747 B1 * | 6/2002 | Berry | | H04M 3/51 370/270 |
| 6,687,745 B1 * | 2/2004 | Franco | | G06F 8/60 709/219 |
| 2002/0138185 A1 * | 9/2002 | Trsar | | G07C 5/0808 701/29.1 |
| 2003/0095038 A1 * | 5/2003 | Dix | | G07C 5/008 340/425.5 |
| 2003/0112949 A1 * | 6/2003 | Brown | | H04M 3/2281 379/207.14 |
| 2003/0186706 A1 * | 10/2003 | Bergins | | H04W 99/00 455/452.2 |
| 2004/0193458 A1 * | 9/2004 | Bear | | G06Q 10/109 705/5 |
| 2004/0198366 A1 * | 10/2004 | Crocker | | H04W 76/028 455/452.1 |
| 2004/0203730 A1 | 10/2004 | Fraser et al. | | |
| 2004/0235509 A1 * | 11/2004 | Burritt | | H04M 3/42195 455/519 |

(Continued)

FOREIGN PATENT DOCUMENTS

CN           1917686 A        2/2007

OTHER PUBLICATIONS

Chinese Office Action dated Mar. 19, 2010 for Chinese Patent Application for 200810178741.3, 7 pages.

*Primary Examiner* — Khaled Kassim
(74) *Attorney, Agent, or Firm* — David Willoughby; Reising Ethington P.C.

(57) ABSTRACT

A connection management system and method manages connections between a vehicle telematics unit and a call center. A connection is established between the vehicle telematics unit and the call center over a wireless network. A first service is provided to the vehicle telematics unit during which a request for a second service is recognized for the vehicle telematics unit. A connection between the vehicle telematics unit and the call center is provided in response to the request for the second service after completion of the first service. This can include maintaining the established connection to carry out the second service or initiating a new connection after the first one is terminated.

17 Claims, 4 Drawing Sheets

(56) References Cited

U.S. PATENT DOCUMENTS

| | | | | |
|---|---|---|---|---|
| 2005/0025182 A1* | 2/2005 | Nazari | ............... | H04W 88/06 370/469 |
| 2005/0027438 A1* | 2/2005 | Rockett et al. | ............... | 701/200 |
| 2005/0071505 A1* | 3/2005 | Grosbach | ............ | H04L 12/5693 709/240 |
| 2005/0136902 A1* | 6/2005 | Mazzara, Jr. | .......... | H04H 20/57 455/418 |
| 2005/0176482 A1* | 8/2005 | Raisinghani | ........ | B60R 16/0234 455/575.9 |
| 2005/0254460 A1* | 11/2005 | Fraser et al. | .................. | 370/328 |
| 2005/0255834 A1* | 11/2005 | Steingruebner | ......... | H04M 3/42 455/414.1 |
| 2005/0282518 A1* | 12/2005 | D'Evelyn et al. | ......... | 455/404.1 |
| 2005/0288830 A1* | 12/2005 | Reeser | ................... | G07C 5/085 701/2 |
| 2006/0025173 A1* | 2/2006 | Kamdar | ............ | H04M 3/42357 455/556.1 |
| 2006/0089733 A1* | 4/2006 | Dickinson | ................ | B60L 3/12 700/83 |
| 2006/0227959 A1* | 10/2006 | Mitchell | ........... | H04M 3/42008 379/221.13 |
| 2006/0258377 A1* | 11/2006 | Economos et al. | ........... | 455/461 |
| 2007/0015485 A1 | 1/2007 | DeBiasio et al. | | |
| 2007/0040651 A1* | 2/2007 | Jung | ............................ | 340/5.74 |
| 2007/0043487 A1* | 2/2007 | Krzystofczyk | ........ | G06Q 10/06 701/29.5 |
| 2007/0123191 A1* | 5/2007 | Simpson | ............ | G01C 21/3608 455/345 |
| 2007/0140253 A1* | 6/2007 | Daigle | ................ | H04L 43/0811 370/395.2 |
| 2007/0143018 A1 | 6/2007 | Murlidar et al. | | |
| 2007/0279203 A1* | 12/2007 | Thomas | ................ | B60C 23/068 340/447 |
| 2008/0027604 A1* | 1/2008 | Oesterling | ...................... | 701/30 |
| 2008/0030345 A1* | 2/2008 | Austin | ................... | A61B 19/44 340/572.8 |
| 2008/0154459 A1* | 6/2008 | Grichnik | ............ | G06Q 10/06 701/29.4 |
| 2008/0301499 A1* | 12/2008 | Grichnik | ........... | G05B 23/0232 714/25 |

* cited by examiner

CONNECTION MANAGEMENT FOR A VEHICLE TELEMATICS UNIT

TECHNICAL FIELD

This invention relates to techniques for handling connections between a vehicle telematics unit and a call center.

BACKGROUND OF THE INVENTION

Wireless communication between a vehicle telematics unit and a call center enables the provision of various services to the vehicle from the call center. These include wireless assistance services such as "roadside assistance" to assist drivers with a variety of services such as electronically unlocking doors, providing navigation instructions, emergency response to an accident, deploying towing assistance, and the like. Typically, the wireless communication employed for these services is via wireless telecommunication through existing cellular network facilities. Monitoring of vehicle operating conditions by the call center is also possible via the telematics device. For example, an air bag deployment event can be automatically reported to the call center where it triggers a return call to the vehicle from a live advisor to determine if emergency services are needed. Other vehicle data such as diagnostic trouble codes (DTCs) and stolen vehicle tracking information can similarly be reported to the call center. Moreover, data services can be provided to the vehicle such as navigation instructions, software updates for vehicle modules, and electronic messages for vehicle occupants.

Sometimes, the provisions of these various services results in multiple services being scheduled or attempted at the same time. Also, in instances where an existing connection with the call center is dropped, a reconnection attempt might be made both by the call center and by the vehicle at the same time, resulting in a conflict of two connection attempts with a telematics unit that only can make one connection at a time. Thus, with the ever-increasing amount of communication services handled by the call center, there is a need for a method of managing these multiple communications.

SUMMARY OF THE INVENTION

In accordance with one aspect of the invention, there is provided a method for managing connections between a vehicle telematics unit and a call center, comprising the steps of:
  (a) establishing a connection between the vehicle telematics unit and the call center over a wireless network;
  (b) providing a first service to the vehicle telematics unit from the call center;
  (c) recognizing at the call center during the established connection that there is a request for a second service for the vehicle telematics unit; and
  (d) providing a connection between the vehicle telematics unit and the call center in response to the request for the second service after completion of the first service.

In accordance with another aspect of the invention managing connections between a vehicle telematics unit and a call center can be done using at least the steps of:
  (a) establishing a connection between the vehicle telematics unit and the call center over a wireless network;
  (b) providing a first service to the vehicle telematics unit from the call center;
  (c) recognizing at the call center a request for a second service for the vehicle telematics unit from the call center;
  (d) determining whether the second service can be conducted over the established connection between the call center and the vehicle telematics unit; and
  (e) providing a connection between the vehicle telematics unit and the call center based on the determination.

In accordance with another aspect of the invention, it is possible for a connection established between the vehicle telematics unit and the call center to be terminated prior to completion of a service. When this happens, the method for managing connections can comprise the steps of:
  (a) establishing a connection between the vehicle telematics unit and the call center over a wireless network;
  (b) providing a service to the vehicle telematics unit from the call center;
  (c) recognizing that the established connection between the vehicle telematics unit and the call center has been terminated prior to completion of the service;
  (d) attempting to reestablish a connection between the vehicle telematics unit and the call center;
  (e) terminating any attempt by the call center to initiate a connection between the vehicle telematics unit and the call center upon the recognition of an established second connection between the vehicle telematics unit and the call center; and
  (f) completing the service with the vehicle telematics unit.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
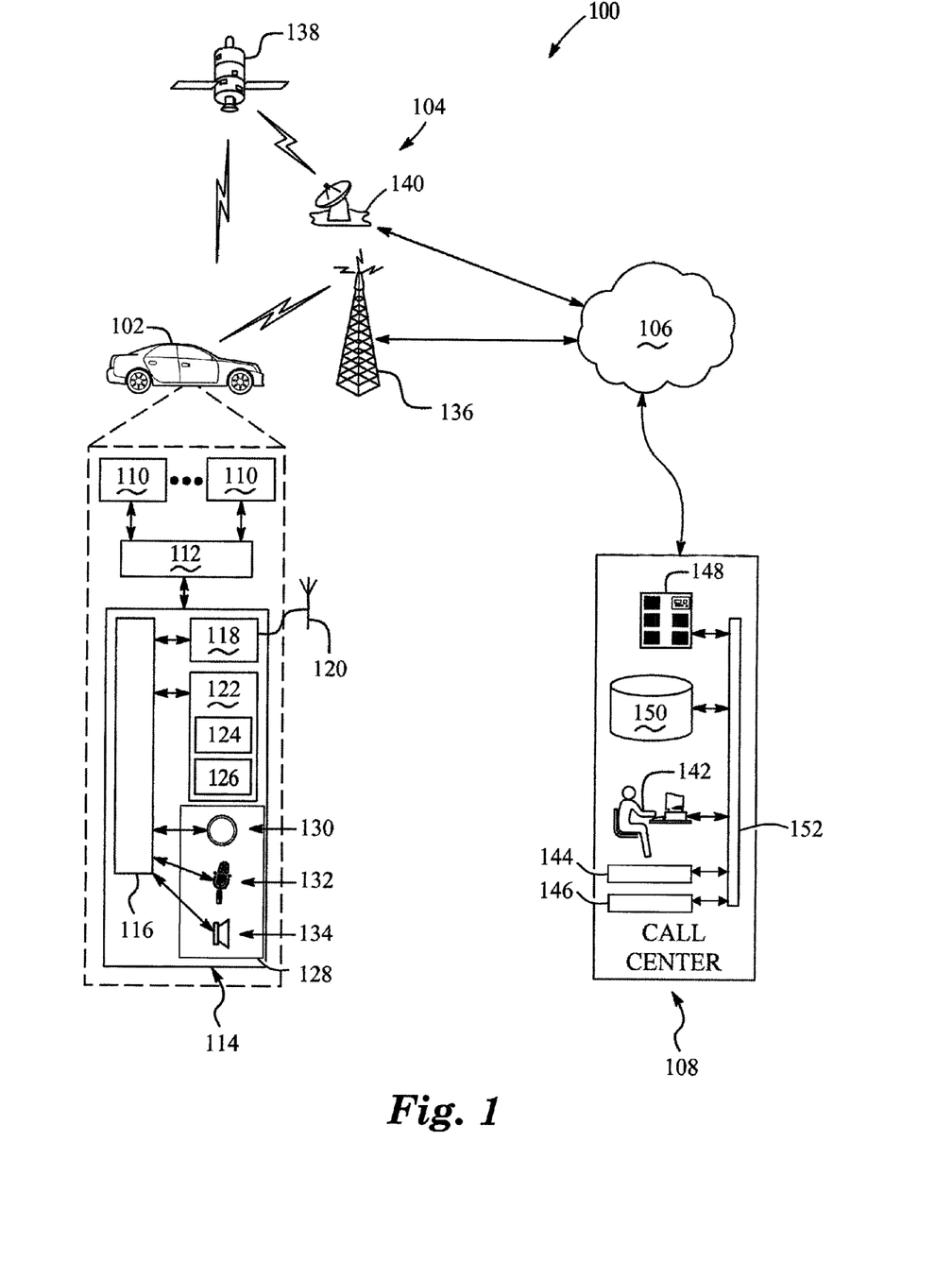
FIG. 1 is a block diagram of a system capable of implementing the method for managing connections between a vehicle telematics unit and a call center.

An exemplary operating environment is illustrated in FIG. 1, and can be used to implement a presently disclosed method for managing connections between a vehicle telematics unit and a call center. The method can be carried out using any suitable telematics system and, preferably, is carried out in conjunction with a vehicle telematics system such as system 100. Those skilled in the art will appreciate that the overall architecture, setup, operation, and individual components of the system 100 are generally known in the art. Thus, the following system description simply provides a brief overview of one such exemplary telematics system, but other systems and components not shown here could also support the presently disclosed method.

The exemplary telematics system 100 includes a vehicle 102 for carrying one or more occupants or users, and a wireless communication system 104 for providing wireless communication to and from the vehicle 102. Also, the system 100 can include a second communications system 106 for communicating the wireless communication system 104 with a call center 108 of the system 100 that provides services to the vehicle 102. Further, the system 100 can include a web server (not shown) in communication with the vehicle 102 and/or the call center 108 for providing Internet services thereto.

The system 100 can generally facilitate one or more suitable services for vehicle occupants such as vehicle navigation, turn-by-turn driving directions, infotainment, emergency services, vehicle diagnostics, vehicle system updates, and hands-free telephony and vehicle interaction using automatic speech recognition. For this purpose, the system 100 processes data and instructions as well as facilitates wireless voice and data transfer between hardware located on the vehicle 102 and hardware in the remote call center 108. For example, the system 100 enables vehicle occupants to initiate voice communication with the call center 108. Also, the system 100 enables data communication between the vehicle 102 and a web server or call center 108 for various purposes such as transmitting and/or receiving data such as voice messages, email, news, Internet content, and/or the like.

Vehicle

The vehicle 102 is depicted in the illustrated embodiment as a passenger car, and it will be appreciated that any other vehicles including motorcycles, marine vessels, aircraft, recreational vehicles, and other automobiles such as vans, trucks, or the like, can be used without departing from the scope of the invention. Various electronic modules can be located on the vehicle 102 and include one or more vehicle system modules (VSMs) 110, an on-board vehicle communication bus 112, and one or more vehicle telematics units 114 connected by the bus 112 to the VSMs 110.

The VSMs 110 facilitate any suitable on-board functions such as vehicle diagnostics, monitoring, control, reporting, and/or other functions. For example, the VSMs 110 can be used for controlling engine operation, monitoring and deploying air bags or other safety devices, and/or diagnosing vehicle systems via various vehicle sensors. The VSMs 110 broadly represent any software, electronic, or electromechanical subsystems, and related sensors or other components throughout the vehicle with which the telematics unit 114 interacts. In a specific example, if the call center 108 sends a signal to the vehicle 102 to unlock the vehicle doors, then the telematics unit 114 instructs an electromechanical door lock VSM to unlock the doors.

The vehicle communication bus 112 facilitates interactions among various vehicle systems, such as the VSMs 110 and/or the telematics unit 114, and uses any suitable network communication configuration whether wired or wireless. Suitable interfaces can be interposed between the bus 112 and the various vehicle systems. As used herein, the term interface broadly means any suitable form of electronic device or adapter, or even a software module or adapter, to enable one piece of equipment to communicate with or control another piece of equipment. A few examples of buses include a Controller Area Network (CAN), Media Oriented System Transport (MOST), Local Interconnect Network (LIN), Ethernet (10baseT, 100baseT), Local Area Network (LAN), a wireless area network (WAN), and/or any suitable International Standard Organization (ISO) or Society of Automotive Engineers (SAE) communication standards.

The vehicle telematics unit 114 facilitates communication and other services between the vehicle 102 or occupants thereof, and various remote locations including the call center 108. The telematics unit 114 interfaces with the various VSMs 110 via the vehicle communication bus 112. The telematics unit 114 can be implemented in any suitable configuration, but can include a processor 116, a communications device 118 for wireless communication to and from the vehicle 102 via one or more antennas 120, a memory 122 to store computer programs 124 and/or one or more databases 126, and a user interface 128. The telematics unit 114 also includes any suitable interface(s) for intercommunicating the aforementioned devices.

Although depicted in FIG. 1 as separate individual modules, it will be appreciated by those skilled in the art that many of the components of the telematics unit 114 can be integrated together, or integrated and/or shared with other vehicle systems. For example, the memory 122 can be incorporated into the processor 116 or located outside of telematics unit 114 and shared with one or more other vehicle systems such as a vehicle central processing unit. Although the VSMs 110 are shown separate from the telematics unit 114, it is possible for any combination of these VSMs 110 to be integrated within the telematics unit 114. Furthermore, the telematics unit 114 could include additional components not shown, or could omit some of the components shown.

The telematics processor 116 is implemented in any of various ways known to those skilled in the art such as in the form of a controller, microprocessor, microcontroller, host processor, vehicle communications processor, Application Specific Integrated Circuit (ASIC), or as any other appropriate processor type. Alternatively, the processor 116 can work in conjunction with a central processing unit (not shown) performing the function of a general purpose computer. The processor 116 can be associated with other suitable devices and/or modules (not shown) such as a real time clock device to provide accurate date and time information, and/or a timer module to track time intervals.

The processor 116 executes the one or more programs 124 stored in memory 122 to carry out various functions such as system monitoring, data processing, and communicating the telematics unit 114 with the VSMs 110, vehicle occupants, and remote locations. For example, the processor 116 can execute one or more control programs and processes programs and/or data to enable a method of sampling rate independent speech recognition, either alone or in conjunction with the call center 108. In another example, the processor 116 controls, generates, and accepts signals transmitted between the telematics unit 114 and call center 108, and between the telematics unit 114 and the vehicle communication bus 112 that is connected to the various VSMs 110. In one mode, these signals are used to activate programming and operation modes of the VSMs 110.

The telematics memory 122 can be any electronic storage device that provides computer-readable storage of data and programs for use by the processor 116. The memory 122 can include volatile, and/or non-volatile memory storage such as RAM, NVRAM, hard disks, flash memory, and/or the like, and can be implemented as one or more separate physical devices. The programs 124 include one or more computer programs that are executed as instructions by the processor 116 to carry out various functions of the telematics unit 114 such as messaging, diagnostics, communication, speech recognition, and/or the like. For example, the programs 124 resident in the memory 122 and executed by the processor 116 can be used to enable a method of sampling rate independent speech recognition. The database 126 can be used to store message data, diagnostic trouble code data or other diagnostic data, vehicle data upload (VDU) records, event activation tables, speech recognition data, and/or the like. The database 126 can be implemented as database tables that enable lookups to be performed on data stored in the database 126, and this can be done using known indexing techniques, database queries, straight serial searching through such tables, and/or any other suitable storage and lookup techniques.

The telematics communications device 118 and associated antenna 120 transmits and receives voice and data to and from the wireless communication system 104 so that the telematics unit 114 can communicate with the call center 108 such as via the second communication system 106. The communications device 118 provides such wireless communication via cellular, satellite, and/or other wireless path, and can facilitate voice and/or data communication, wherein both voice and data signals can be sent and received over a voice channel and/or vice-versa. Those skilled in the art will recognize that the communications device 118 can transmit and receive data over a voice channel by applying any suitable type of encoding or modulation to convert digital data for communication through a vocoder or speech codec incorporated in a cellular chipset. Any suitable encoding or modulation technique that provides an acceptable data rate and bit error rate can be used. The communications device 118 can include any other suitable modules as discussed below.

The communications device 118 can include a telephony module including communications software and hardware such as a wireless modem and/or a mobile telephone. The mobile telephone can be any suitable wireless telephony device such as a mobile telephone, which can be analog, digital, dual mode, dual band, multi-mode, and/or multi-band. The mobile telephone can include a separate processor and memory, and/or a standard cellular chipset. Moreover, the mobile telephone can use any suitable cellular technology such as Advanced Mobile Phone System (AMPS), code division multiple access (CDMA), time division multiple access (TDMA), Global System for Mobile communications (GSM), or the like, but could also utilize proprietary or other wireless technologies to communicate with the wireless communication system 104. Some of the features of communications device 118 can be implemented using processor 116, such as the modem which can be carried out in software using processor 116.

The telematics user interface 128 includes one or more input and output interfaces to receive input from, and transmit output to, telematics users. As used herein, the term user includes telematics service subscribers, vehicle occupants including drivers and passengers, and the like. Also, as used herein, the term user interface broadly means any suitable form of electronic device or adapter, or even a software module or adapter, which enables vehicle occupants to communicate with or control another piece of equipment. The user interface 128 can include individual components distributed throughout the vehicle, and/or can be integrated as a single unit such as a human/machine interface (HMI), multi-media center, or the like. Multi-media centers can receive and store downloads of content such as music, webpages, movies, television programs, videogames, or the like, for current or delayed playback.

The input interfaces can include one or more tactile devices 130, one or more microphones 132, or any other types of input technology. First, the tactile input device 130 enables vehicle occupants to activate one or more functions of the telematics unit 114, and can include one or more pushbutton switches, keypads, keyboards, or other suitable input devices located within the vehicle 102 in reach of the vehicle occupants. For example, the tactile input device 130 can be used to initiate telecommunications with remote locations such as the call center 108 or mobile telephones and/or to initiate vehicle updates, diagnostics, or the like. Second, the microphone 132 allows vehicle occupants to provide vocal input to the telematics unit 114, and enables vocal communication with various remote locations via the communications device 118. Vocal input from vehicle occupants can be interpreted using a suitable analog-to-digital interface and/or digital signal processor such as a sound card (not shown) between the microphone 132 and the processor 116, and voice and speech recognition programs and data stored within the memory 122.

The output interfaces can include one or more speakers 134, a visual display device such as a liquid crystal display, plasma screen, touch screen, heads-up display, or the like (not shown), or any other types of visual output technology. The speakers 134 enable the telematics unit 114 to communicate audible speech, signals, audio files, or the like to vehicle passengers, and can be part of a vehicle audio system or stand-alone components specifically dedicated for use with the telematics unit 114. A suitable interface such as a sound card (not shown) can be interposed between the speakers 134 and the telematics processor 116.

Communication System(s)

The communication systems 104, 106 can be implemented separately or can be combined as an integral system. Also, with suitable equipment, the call center 108 can be wirelessly communicated directly to the wireless communication system 104 without the second system 106.

The wireless communication system 104 can include one or more analog and/or digital cellular networks 136, a wireless computer network such as a wide area network (WAN), wireless local area network (WLAN), broadband wireless area (BWA) network, and/or any other suitable wireless network used to transmit voice and/or data signals between the vehicle 102 and various remote locations such as the call center 108. The exemplary cellular network 136 can be implemented as a CDMA, GSM, or other cellular communication network that enables exchange of voice and data between the vehicle 102 and the second communication system 106. The network 136 can include any suitable combination of cell towers, base stations, and/or mobile switching centers (MSC). For instance, a base station and cell tower could be co-located at the same site or they could be remotely located from one another, each base station could service a single cell tower or multiple cell towers, and various base stations could be coupled to a single MSC, to name but a few of the possible arrangements. A speech codec or vocoder can be incorporated in the system 104, such as in one or more of the base stations, but depending on the particular architecture of the wireless network, it could be incorporated within an MSC or some other network component as well.

The system 104 can also or alternatively carry out wireless communication by satellite transmission using one or more satellites 138 to communicate the vehicle 102 with the call center 108 via a ground-based satellite transceiver 140. As an exemplary implementation, the satellite transceiver 140 and satellite(s) 138 can transmit radio signals to the vehicle 102. For example, a satellite transmission can be broadcast over a spectrum in the "S" band that has been allocated by the U.S. Federal Communication Commission for national broadcasting of satellite-based Digital Audio Radio Service (DARS). More specifically, satellite transmission can be carried out using XM™ brand satellite radio services.

The second communication system 106 can be a land-based wired system such as a public switched telephone network (PTSN), Internet Protocol (IP) network, optical network, fiber network, cable network, and/or utility power transmission lines. The system 106 can also be another wireless communication system like system 104, WAN, WLAN, or a BWA network, or any combination of the aforementioned examples, any of which can be used or adapted for voice and/or data communication.

Call Center

The call center 108 provides services to the vehicle 102 by processing and storing data, and communicating with the vehicle 102. The call center 108 can provide back-end functions to the vehicle telematics unit 114 and can include one or more fixed or mobile data centers in one or more locations. The call center 108 can include advisors 142 to monitor various vehicle conditions, respond to service requests, and provide vehicle services such as remote vehicle assistance in connection with in-vehicle safety and security systems. The advisors 142 can be implemented as live human advisors, or as automatons or computer programs responsive to user requests.

The call center 108 includes one or more voice and/or data interfaces 144 such as wired or wireless modems, switches such as private branch exchange (PBX) switches, and/or routers. The interface(s) 144 transmit and receive voice and/or data signals, such as by vehicle data uploads (VDUs), between the vehicle telematics unit 114 and the call center 108 through one or both of the communications systems 104, 106. For data-over-voice communication, the interface (s) 144 preferably apply some type of encoding or modulation to convert digital data for communication with a vocoder or speech codec.

The call center 108 can further include one or more communication service managers 146, one or more servers 148 to process data, one or more suitable databases 150 to store user data such as subscriber profiles and authentication data, and any other suitable data. The call center 108 can also include one or more wired and/or wireless networks 152 such as a LAN or WLAN, for connecting the call center components together along with the any computer(s) used by the one or more advisors 142. For example, the servers 148 and databases 150 execute and store one or more control programs and data to enable a method of sampling rate independent speech recognition, either alone or in conjunction with the telematics unit 114 of the vehicle 102. In other words, the presently disclosed method can be enabled by the telematics unit 114 of the vehicle 102, by the computing equipment and/or personnel in the call center 108, or by any combination thereof.

Method for Managing Connections

Figure 2:
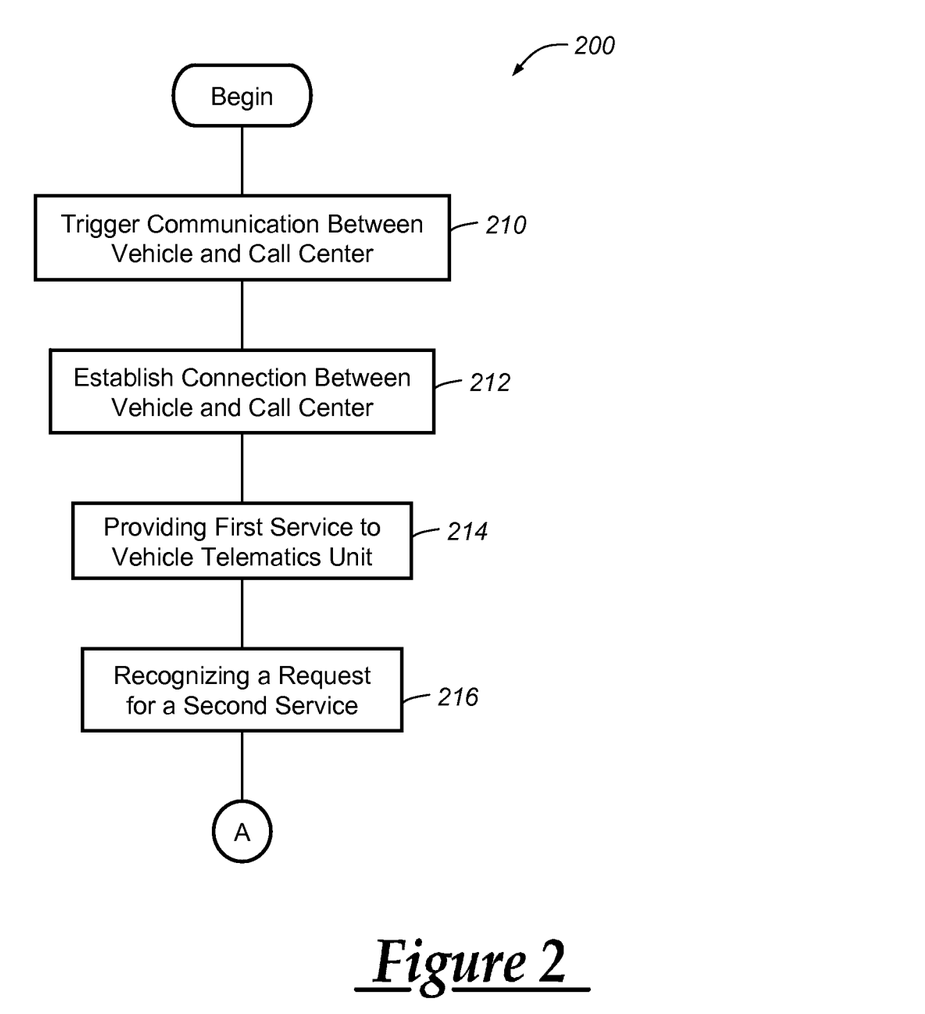
FIG. 2 is a flowchart showing some of the steps of an embodiment of the connection management method.

Referring now to FIG. 2, there is provided a flowchart showing some of the steps of an embodiment of the connection management method implemented via system 100. Those skilled in the art will also recognize that the method can be carried out using other systems within other operating environments.

The method is provided to improve the handling of connections between vehicle telematics units 114 and call centers 108. As the number of services provided by call centers 108 to vehicle telematics units 114 continues to increase, it is becoming more important to manage how call centers 108 will handle both current connections and scheduled connections to the telematics units 114. Currently, many types of services are for the telematics units 114 are scheduled at the call center 108. A scheduled service is a service that is scheduled to be performed at a particular time or upon a trigger. Coordinating the scheduled services may reduce the number of connections necessary between the vehicle 102 and call center 108 to perform all of the scheduled services. The reduced number of connections can free up resources at the call center 108 to handle services for other vehicles or handle other tasks. Additionally, unscheduled connections between the vehicle 102 and call center 108 are often made such as service requests made by a customers. Managing these connections may allow the call center 108 to utilize the unscheduled connection for other scheduled services. Moreover, a connection may terminate prematurely, that is, prior to completion of a service. A strategy to handle prematurely terminated connections can reduce inefficiencies if multiple resources were to attempt to re-establish the connection.

FIG. 2 illustrates an exemplary method for managing connections between a telematics unit 114 and a call center, as discussed in detail below.

At step 210, a request for a connection between the telematics unit 114 and the call center 108 can be triggered. Triggers or trigger events can be created by an event at the vehicle such as a data buffer becoming full on a VSM 110, or a user initiated request, such as for navigation directions. The triggers can instead be set by the call center, such as during an existing call so that the vehicle will initiate a subsequent call to the call center upon the occurrence of one or more specified conditions. Also, triggers can also be time based and can occur at regular intervals, such as once a week, once a month, or the like, or can be scheduled to occur only a single time. Time based triggers can be scheduled to maximize the likelihood that a connection can be established between the telematics unit 114 and the call center 108. For example, an event can be scheduled for a time of day when the vehicle is not likely to be in driven to minimize the likelihood that the telematics unit 114 will be in use by a user, or a time when the amount of network traffic over the wireless is likely to be minimal.

At step 212, in response to the trigger, a connection is established between the telematics unit 114 and the call center 108. The connection may be any number of wireless connection types such as a cellular voice connection, a digitized data packet connection via a wireless wide area network 104 such as a cellular network, a Wi-Fi network, or the like. Other types of connections are also possible including short message service connections (SMS) via the cellular network for sending text information between the telematics unit 114 and the call center 108.

At step 214, a first service is provided to the telematics unit 114. The service can be provided by the call center 108. The services can be provided in response to user requests, call center requests, or vehicle requests. For example, user requested service can include: a diagnostic check of the vehicle, navigation directions, emergency response to an accident, vehicle door unlock, identification of the vehicle, retrieving voice mail, adding calling minutes, directory assistance, and the like. Call center 108 requested services can include scheduled services such as updating software on a VSM 110, obtaining a vehicle diagnostic report, obtaining a vehicle data upload and the like. Vehicle requested services can include a vehicle data upload from a VSM 110 to the call center 108 in response to a scheduled data upload or in response to a full buffer on the VSM.

The user can communicate with an advisor 142 at the call center 108 to make a user request. The advisor 142 may be a live advisor at the call center 108 or a virtual advisor such as an automaton or computer program. Communication between the user and the advisor 142 can be transmitted via a voice channel of the cellular communication network 104 or via audio transmitted over a digital packet data connection. Services for vehicle requests and call center 108 requests can be performed over any number of data connections including: data sent over a voice channel of a cellular network connection, data sent via an SMS text message, or as packet data sent over a digital packet data connection. Communication between the telematics unit 114 and the call center 108 can be bi-directional to facilitate communicating the service request, acknowledging the service request, and providing the service. For example, a user may request navigation instructions from the call center 108. The call center 108 may respond by uploading navigation instructions to the telematics unit 114 via the established connection. In another example, the vehicle may request a data upload of a data from a VSM 110, receive a response from the call center, and upload the data to the call center 108.

At step 216, a request for a second service is recognized. The request may be recognized at the call center 108. The request can be initiated by the user, the vehicle 102, or the call center 108. In one alternative, the request for the second service can be a scheduled service. The scheduled service can be recognized if the service is scheduled to be performed at the present time or in the near future. For example, a service can be scheduled to transfer a software update for a VSM 110 on the vehicle 102 several hours from now. But, because a current connection is established between the telematics unit 114 and the call center 108, it can be advantageous to perform the scheduled service now, rather than trying to establish a new connection between them several hours later. Therefore, when connections are established between the telematics unit 114 and the call center 108, the call center can determine whether there are services scheduled to be performed in the near future for the vehicle 102.

In one alternative, the request for second service may be a request to re-establish the connection originally established at step 212. Occasionally wireless connections can be lost for any number of reasons. For example, the vehicle can drive out of a service area within a wireless network 104, large objects such as buildings can interference with wireless signals, temporary glitches can occur in the wireless network 104, or the user can accidentally end a call to the call center 108 prematurely.

At step 218, a determination is made as to whether the established connection has been terminated. A further determination can be made whether the connection was terminated before the first service was completed. If the connection was not terminated the method may continue at step 230 on FIG. 4. which will be discussed further below. If the connection is determined to have been terminated then the method will continue at step 220 on FIG. 3.

Figure 3:
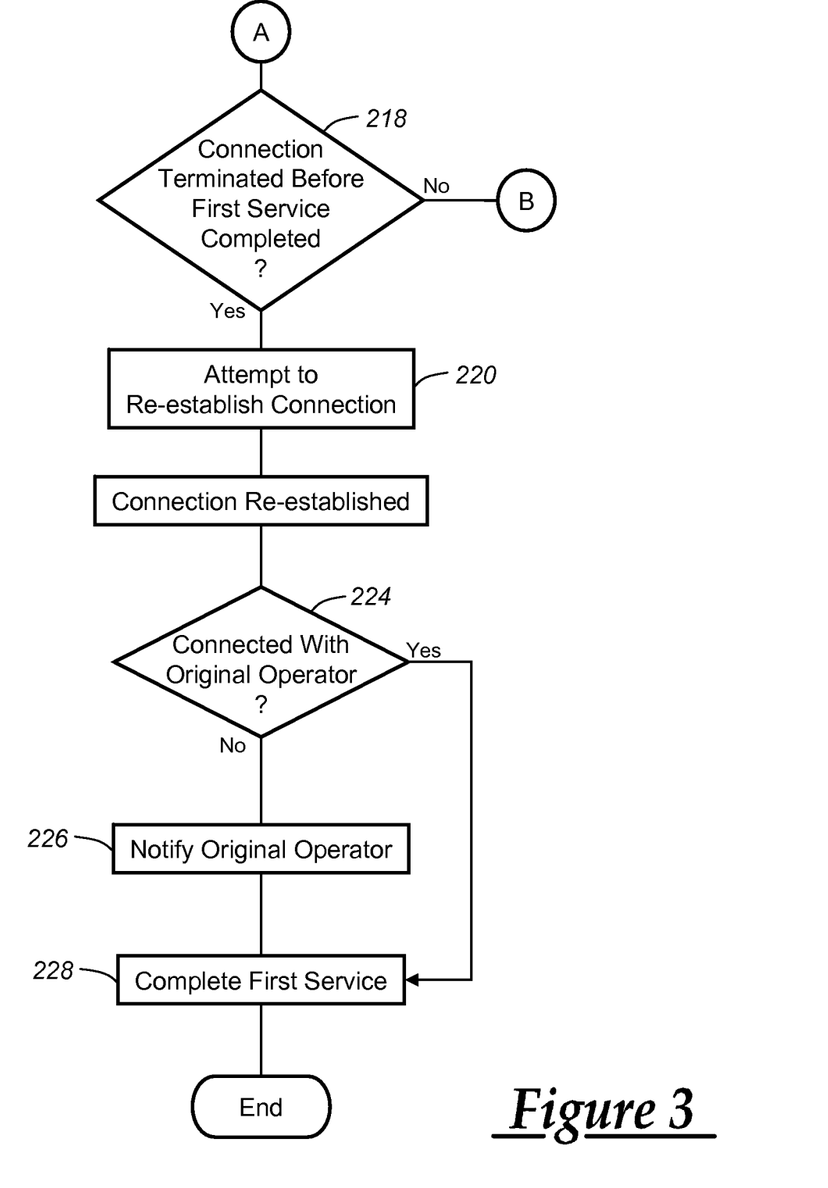
FIG. 3 is a flowchart showing additional steps for the method continuing from FIG. 2.

At step 220, an attempt is made to re-establish the terminated connection. The attempt can be made by the telematics unit 114, the call center 108, or both. For example, the user at the telematics unit 114 may attempt to redial the call center 108 in order to complete the first service. Alternatively, the call center 108 may attempt to reconnect to the telematics unit 114 to complete the first service. The call center 108 may automatically redial the telematics unit 114 or a live advisor may manually attempt to re-dial the telematics unit 114. It is possible that both the telematics unit 114 and the call center 108 may attempt to reestablish the terminated connection at the same time. When this happens, the call center 108 attempts to call the telematics unit 114 are unlikely to be successful if they are attempting to establish a cellular voice connection and the telematics unit 114 only contains one cellular chipset. In this example, the call center's attempts to call the vehicle can use resources at the call center 108 that could otherwise be available for performing other tasks, such as communicating with other vehicles. For example, while the user in the telematics unit 114 is attempting to call back to the call center 108 the call center 108 may not be able to reestablish its connection to the telematics unit 114 by dialing the telematics unit 114, but instead, may receive a busy signal because the telematics unit 114 is in use and is attempting to call the call center 108. One strategy to handle this is to assign the telematics unit 114, and not the call center 108, with the task of automatically attempting to reestablish the connection between them or vice versa.

At step 222, the connection between the telematics unit 114 and the call center 108 is reestablished. The connection may be reestablished by either the connection initiated by the telematics unit 114 or the connection initiated by the call center 108. For services involving the use of a live advisor 142, if the telematics unit 114 has reestablished the connection, it is possible that the re-established call at the call center will not have been directed to the same advisor 142 (the original advisor) that was performing the first service. Therefore, at step 224, it is determined whether the telematics unit 114 is connected at the call center 108 with the original advisor 142 that was performing the first service. If the telematics unit 114 is connected with the original advisor 142 the method continues at step 228. At step 228, the first service is performed and completed by the call center 108. Upon complete of the first service the method is complete. Alternatively, if it was determined that the telematics unit 114 is not connected with the original advisor 142 at step 224, the method continues at step 226.

At step 226, the original advisor 142 is notified that the telematics unit 114 is connected with a new advisor 142. This can include transferring the connection to the telematics unit 114 to the original advisor 142 to complete the first service. Alternatively, the notification can include instructing the original advisor 142 to cease any attempts to re-establish the connection with the telematics unit 114. Canceling advisor 142 attempts to re-establish the connection with the vehicle can free up the advisor 142 and resources, such as a phone line, at the call center 108. For example, rather than the original advisor 142 continuing to try to reconnect to the vehicle 102 (which is already connected elsewhere at the call center 108), the advisor 142 can establish a connection with a new vehicle and provide services to the new vehicle. Moreover, notifying the original advisor 142 can also include enabling the new advisor to provide the first service to the telematics unit 114. This can involve canceling an original service request assigned to the original advisor 142 or can include reassigning the original service request from the original advisor to the new advisor 142 at the call center 108.

It is possible that if the connection is not re-established by the original advisor 142, but by call back from the vehicle or by some other means, that the original advisor 142 may already have been assigned to assist another vehicle prior to the reestablishment of the original connection. Therefore, the advisor 142 can become unavailable and busy with another operation prior to reconnection. Thus, rather than connecting the call with any available advisor, the call center can be configured to connect the re-established call to the original advisor if available, or to give the caller the option of being switched to the original advisor versus a new advisor.

Figure 4:
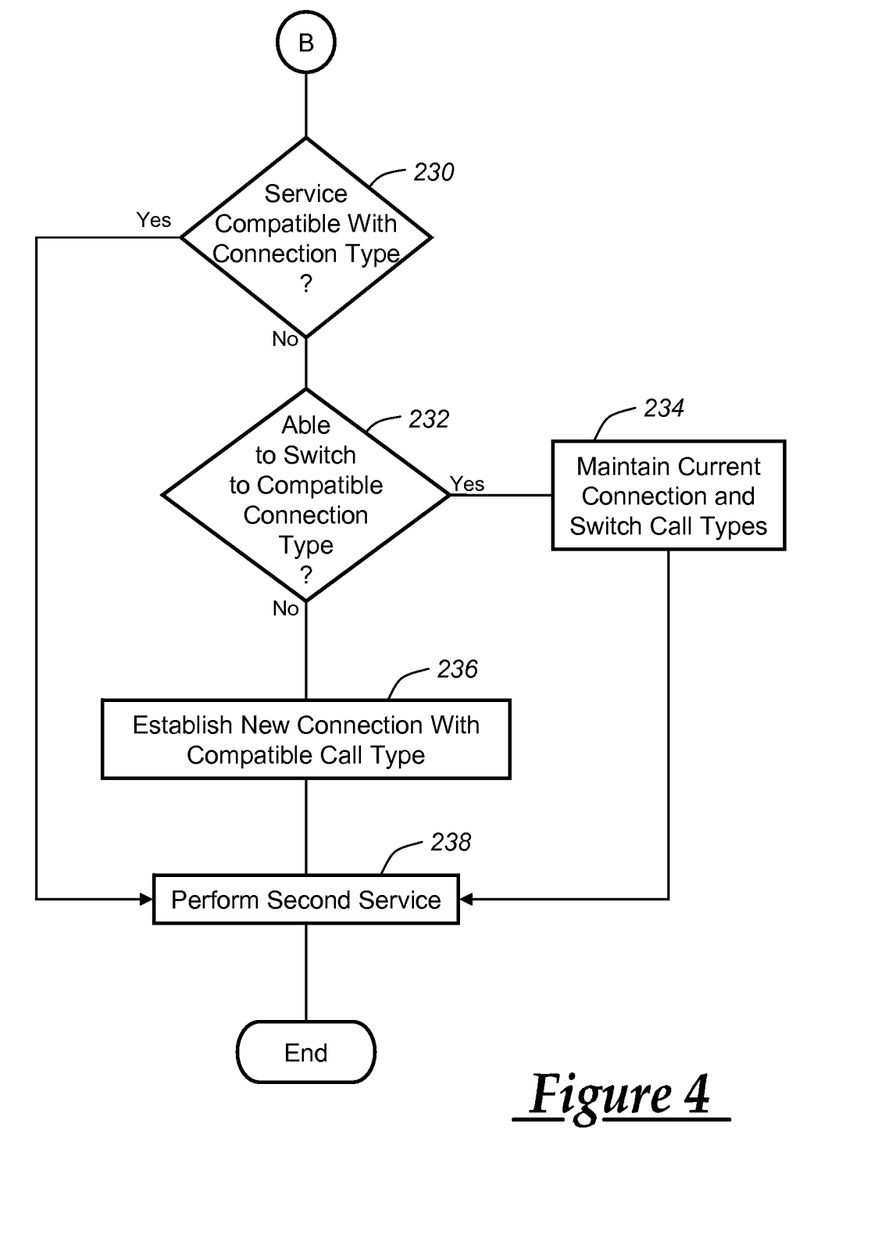
FIG. 4 is a flowchart showing additional steps for the method continuing from FIG. 3.

After the notification, the first service is completed for the telematics unit 114 at step 228, and then continues at step 230 of FIG. 4 to process the second service request. Thus, regardless of whether the process flows to step 230 from either step 218 or 228, there will be an established connection present.

At step 230, it is determined whether the second service is compatible with the current connection type. Various services can require different connection types. Therefore, not all services are compatible with all connection types. A service is compatible with a current connection if that service can be successfully completed using the current connection established between the telematics unit 114 and the call center 108. Moreover the service may be compatible with the current connection type if the service can be completed within a reasonable amount of time. For example, data can be transferred between the telematics unit 114 and the call center 108 over a cellular voice connection. As is known in the art, data can be modulated onto the cellular voice connection, encoded via the vocoder, and transmitted between the telematics unit 114 and the call center 108. But some services require a large amount of data to be transmitted. The transmission of a large amount of data may be too slow to be completed within a desired length of time. For example, software updates for VSM 110 may require a large amount of data to be transferred from the call center 108 to the telematics unit 114. In this case, a data connection over the voice channel of the cellular network may not be suitable for the software update service. As such it may be determined that the software update is not compatible with a cellular voice connection between the telematics unit 114 and the call center 108.

Different services can require different connection types. Typically, services requested by users can require a cellular voice connection between the telematics unit 114 and the call center 108 to enable the user to speak in real time with a live advisor 142. In contrast, scheduled services requested by the vehicle or by the call center 108 can require a high speed data connection between the telematics unit 114 and the call center 108 such as a broadband packet data connection. Therefore, the cellular voice connection may not be compatible with many services requested by the vehicle 102 or by the call center 108.

Moreover, the services may not be compatible with certain connection types based upon connection capabilities at both the telematics unit 114 and the call center 108. For example, some telematics units 114 and/or some call centers 108 may not support voice communication over a digital packet data connection between the telematics unit 114 and the call center 108. Therefore, when the current connection is a digital packet data connection established between the telematics unit 114 and the call center 108, that connection might not be compatible with a user request for a second service because the user request may require a voice connection so that the user can speak with an advisor 142 at the call center 108. For example, if a packet data connection is established for the first service, and a second service is recognized as a user request for navigation directions, the second service would not compatible with the current connection unless the telematics unit 114 and the call center 108 support voice communication over a packet data connection.

In contrast, if the first service was a user request and the second service is also a user request, the services are compatible with one another and no new connection is necessary. Likewise multiple call center and vehicle requested services may use compatible connections between the telematics unit 114 and the call center 108. For example, a vehicle requested first service to upload vehicle data to the call center 108 may establish a digital packet data connection. A call center requested second service for a software update of a VSM 110 may also be compatible with a data packet connection and therefore compatible with the current connection type.

If the second service is compatible with the current connection, the method continues at step 238 and the second service is performed using the current connection. If it is determined that the second service is not compatible with the current connection type at step 230 the method continues at step 232.

At step 232, it is determined whether the current connection can be switched to a connection type compatible with the second service. For example, if the original connection type was a cellular voice connection between the telematics unit 114 and the call center 108, it may be possible to switch the connection type to support data over the cellular voice channel. Therefore, if the second service is compatible with the cellular data connection and the cellular connection can be switched to transfer data over the cellular voice channel, then the switch would satisfy the determination in step 232.

In another example, the established connection for the first service may be a packet data connection type and the second service may require voice communication between the user and the operation. Therefore, if the call center 108 and telematics unit 114 support transferring audio over the packet data connection, then the connection may be switched to be compatible with the second service. If the determination is that the current connection can be switched to a connection type compatible with the second service then the method continues at step 234.

At step 234, the current connection is maintained between the telematics unit 114 and the connection type is switched to the determined connection type compatible with the second service. The method continues at step 238, where the second service is then performed, thus completing the method.

Referring back to step 232, if it is determined that the current connection is unable to be switched to a connection type compatible with the second service then the method continues at step 236.

At step 236, a connection compatible with the second service is established between the telematics unit 114 and the call center 108. In one implementation, the call center 108 may terminate the original connection between the telematics unit 114 and initiate a new connection between the call center 108 and the telematics unit 114 using a compatible connection type. In another implementation, the call center 108 may send a request to the telematics unit 114 to request the telematics unit 114 to initiate a connection back to the call center 108 using a compatible connection type. This request can be transmitted during the established connection used to carry out the first service prior to termination of that call. This approach for setting up the second connection is useful in situations where is desirable or necessary to have the telematics unit 114 initiate the connection with the call center 108 rather than having the call center 108 initiate the connection to the telematics unit 114. One reason is that the call center 108 likely has multiple connections available for receiving connections from one or more vehicles. The telematics unit 114 on the other hand, may only have one connection such as a single cellular chipset to connect to the call center 108. As such, the telematics unit 114 is better able to identify when it is available to make a connection to the call center 108 than the call center 108 is able to identify a connection to the telematics unit 114 is available. Moreover, because the vehicle is traveling, it may be entering into locations where a wireless signal is unavailable, intermittent or even weak. As such the telematics unit 114 may have intelligence to determine when it is likely to be successful in completing a connection to the call center 108 such as through the cellular network based upon the signal strength at the telematics unit 114. In both of these scenarios, the telematics unit 114 can have intelligence to wait for until its resources are available to complete a connection to the call center 108. In contrast, the call center 108 would not be able to determine why its attempts to establish a connection to the telematics unit 114 are unsuccessful, nor would the call center 108 be able to predict when the attempts would become successful. In the meantime, the call center 108 would be utilizing resources while trying unsuccessfully to reconnect with the vehicle 102.

Once the connection between the telematics unit 114 and the call center 108 has been established at step 236 the method continues at step 238. At step 238 the second service is performed. Upon completion of the second service the method is complete.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims. Moreover, the method can vary from of the combination of steps discussed above. For example, separate connection management strategies can be implemented for connections terminated before completion of the first service and connections where a scheduled second service is recognized.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for managing connections between a vehicle telematics unit and a call center, comprising the steps of:
(a) scheduling, at a call center, one or more services for a vehicle having a vehicle telematics unit;
(b) establishing a connection between the vehicle telematics unit and the call center over a wireless network in response to a request for an unscheduled service;
(c) providing the unscheduled service to the vehicle telematics unit from the call center over the established connection;
(d) recognizing at the call center during the established connection that there is a previously-scheduled service for the vehicle telematics unit necessitating a connection between the vehicle telematics unit and the call center over the wireless network; and
(e) providing a connection between the vehicle telematics unit and the call center to carry out the previously-scheduled service after completion of the unscheduled service whereby the established connection that is used for the unscheduled service can be used to provide the connection for the previously-scheduled service when the previously-scheduled service can be carried out with the established connection.

2. The method set forth in claim 1, wherein step (e) further comprises maintaining the established connection between the vehicle telematics unit and the call center after completion of the unscheduled service and thereafter carrying out the previously-scheduled service using the established connection.

3. The method set forth in claim 1, wherein step (e) further comprises terminating the established connection between the vehicle telematics unit and the call center after completion of the unscheduled service, and establishing a second connection between the vehicle telematics unit and the call center using a different connection type for the previously-scheduled service than the connection type for the unscheduled service.

4. The method set forth in claim 1, wherein step (e) further comprises sending a request to the vehicle telematics unit to call the call center to establish a connection for the previously-scheduled service after completion of the unscheduled service.

5. The method set forth in claim 1, wherein the connection for the previously-scheduled service is a different connection type than the connection for the unscheduled service.

6. The method set forth in claim 1, further comprising the step of maintaining a database of services scheduled for the vehicle.

7. The method set forth in claim 1, further comprising the steps of:
recognizing that the established connection was disconnected prior to completion of the unscheduled service; and
generating a request to establish a second connection between the vehicle telematics unit and the call center.

8. The method set forth in claim 7, wherein step (e) further comprises:
establishing a second connection between the vehicle telematics unit and the call center;
terminating the generated request to establish a connection between the vehicle telematics unit and the call center; and
completing the unscheduled service using the second connection.

9. A method for managing connections between a vehicle telematics unit and a call center, comprising the steps of:
(a) establishing a connection between the vehicle telematics unit and the call center over a wireless network, the connection having a connection type;
(b) providing a first service to the vehicle telematics unit from the call center over the established connection;

(c) recognizing at the call center a previously-received request for a second service for the vehicle telematics unit from the call center during the established connection;

(d) determining whether it is possible to carry out the second service over the established connection between the call center and the vehicle telematics unit based at least in part on the connection type; and (e) providing a connection between the vehicle telematics unit and the call center based on the determination, wherein when it is possible to carry out the second service over the established connection, the provided connection is the established connection and when it is not possible to carry out the second service over the established connection or another connection type is preferred, the provided connection is a different type of connection than the established connection.

10. The method set forth in claim 9, further comprising the step of scheduling at least one service for the telematics unit from the call center; and wherein step (c) further comprises recognizing at the call center that the second service is due to be performed for the telematics unit from the call center.

11. The method set forth in claim 10, further comprising the step of performing the second service by performing the second service due to be performed via the provided connection between the vehicle telematics unit and the call center.

12. The method set forth in claim 9, wherein the first service is a data call, and the request for the second service is a user call from the vehicle telematics unit to the call center that interrupts the completion of the first service; and the method further comprising the step of providing a connection between the vehicle telematics unit and the call center for the first service after completion of the second service and completing the first service.

13. The method set forth in claim 9, wherein providing a connection between the vehicle telematics unit and the call center compatible with the second service includes maintaining the established connection between the vehicle telematics unit and the call center if the determination is that the second service can be conducted via the established connection.

14. The method set forth in claim 9, wherein providing a connection between the vehicle telematics unit and the call center compatible with the second service includes establishing a second connection between the vehicle telematics unit and the call center if the determination is that the second service cannot be conducted via the established connection, wherein the second service can be conducted via the second connection.

15. The method set forth in claim 14, wherein establishing a second connection between the vehicle telematics unit and the call center includes sending a request from the vehicle telematics unit to call the call center after completion of the first service via a connection type compatible with the second service request.

16. The method set forth in claim 9, wherein the second connection is a connection type different than the first connection.

17. The method set forth in claim 9, wherein the determination in step (d) further comprises determining whether the second service can be completed within a predetermined time limit using the established connection.

* * * * *